United States Patent
Fuseya et al.

(10) Patent No.: US 12,453,843 B2
(45) Date of Patent: Oct. 28, 2025

(54) DILATOR

(71) Applicant: ASAHI INTECC CO., LTD., Seto (JP)

(72) Inventors: Yukihiro Fuseya, Seto (JP); Hideaki Maki, Seto (JP); Daiki Takahashi, Seto (JP); Akira Sawai, Seto (JP); Marina Tsuzuku, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 861 days.

(21) Appl. No.: 17/029,623

(22) Filed: Sep. 23, 2020

(65) Prior Publication Data

US 2021/0001098 A1 Jan. 7, 2021

Related U.S. Application Data

(63) Continuation of application No. PCT/JP2018/035088, filed on Sep. 21, 2018.

(51) Int. Cl.
*A61M 29/00* (2006.01)
*A61M 25/00* (2006.01)
*A61M 25/06* (2006.01)

(52) U.S. Cl.
CPC ........ *A61M 29/00* (2013.01); *A61M 25/0023* (2013.01); *A61M 25/0053* (2013.01); *A61M 25/005* (2013.01); *A61M 2025/006* (2013.01); *A61M 2025/0687* (2013.01)

(58) Field of Classification Search
CPC .............. A61M 29/00; A61M 25/0023; A61M 25/005; A61M 25/0662; A61M 25/008; A61M 25/0053; A61M 25/0052; A61M 16/0472; A61M 16/0429; A61M 2025/0687; A61M 2025/006; A61B 17/3417; A61B 2017/3458; A61B 2017/3456; A61B 2017/00915
See application file for complete search history.

(56) References Cited

U.S. PATENT DOCUMENTS

| | | | |
|---|---|---|---|
| 4,848,342 A | 7/1989 | Kaltenbach | |
| 5,098,374 A | 3/1992 | Othel-Jacobsen et al. | |
| 5,211,636 A * | 5/1993 | Mische | A61M 25/09 600/585 |
| 5,303,714 A | 4/1994 | Abele et al. | |
| 5,630,813 A * | 5/1997 | Kieturakis | A61B 18/1402 606/41 |

(Continued)

FOREIGN PATENT DOCUMENTS

| | | |
|---|---|---|
| JP | 2502565 Y2 | 6/1996 |
| JP | 2000-57852 A | 2/2000 |

(Continued)

*Primary Examiner* — Dianne Dornbusch
(74) *Attorney, Agent, or Firm* — Oliff PLC

(57) ABSTRACT

A dilator includes a shaft in a hollow shape whose distal end has a smaller outer diameter than the proximal end, and a connector on the proximal end of the shaft. A spirally-arranged protruding portion on an outer peripheral face of the shaft has gaps between neighboring sections along an axis of the shaft. The shaft has a first location and a second location located closer to the distal end than the first location and having an outer diameter smaller than at the first location. The spirally-arranged protruding portion has, with respect to the axis, an angle of inclination that is larger at the second location than at the first location.

20 Claims, 5 Drawing Sheets

(56) References Cited

U.S. PATENT DOCUMENTS

| | | | |
|---|---|---|---|
| 6,508,804 B2* | 1/2003 | Sarge | A61M 25/005 |
| | | | 604/524 |
| 9,126,021 B2 | 9/2015 | Kanazawa | |
| 10,426,923 B2* | 10/2019 | Richter | A61M 25/008 |
| 10,933,224 B2* | 3/2021 | Senn | A61L 31/16 |
| 11,331,459 B2 | 5/2022 | Fuseya et al. | |
| 11,389,631 B2 | 7/2022 | Fuseya et al. | |
| 11,400,254 B2* | 8/2022 | White | A61M 25/0021 |
| 2001/0052721 A1 | 12/2001 | Tanaka | |
| 2002/0077655 A1 | 6/2002 | Frova | |
| 2003/0069522 A1* | 4/2003 | Jacobsen | A61M 25/0051 |
| | | | 600/585 |
| 2003/0139689 A1* | 7/2003 | Shturman | A61M 25/0136 |
| | | | 600/585 |
| 2005/0022585 A1 | 2/2005 | Berkman | |
| 2005/0165405 A1 | 7/2005 | Tsou | |
| 2005/0222585 A1* | 10/2005 | Miyata | A61M 25/0068 |
| | | | 606/127 |
| 2006/0235455 A1 | 10/2006 | Oshida | |
| 2007/0088230 A1 | 4/2007 | Terashi et al. | |
| 2008/0097247 A1* | 4/2008 | Eskuri | A61M 25/09 |
| | | | 600/585 |
| 2009/0005814 A1 | 1/2009 | Miller et al. | |
| 2009/0281500 A1 | 11/2009 | Acosta et al. | |
| 2010/0076264 A1 | 3/2010 | Tallarida et al. | |
| 2010/0318066 A1* | 12/2010 | Miyata | A61M 25/09 |
| | | | 604/526 |
| 2011/0098531 A1 | 4/2011 | To | |
| 2011/0144681 A1 | 6/2011 | Whitman et al. | |
| 2011/0213316 A1 | 9/2011 | Ibrahim et al. | |
| 2011/0270191 A1 | 11/2011 | Paul et al. | |
| 2012/0004606 A1* | 1/2012 | Lentz | A61M 25/0053 |
| | | | 604/103.04 |
| 2012/0029281 A1 | 2/2012 | Frassica et al. | |
| 2012/0116350 A1 | 5/2012 | Strauss et al. | |
| 2012/0265100 A1* | 10/2012 | Maki | A61M 25/09 |
| | | | 600/585 |
| 2012/0310217 A1* | 12/2012 | Maki | A61M 25/09 |
| | | | 604/528 |
| 2013/0090523 A1 | 4/2013 | Van Bladel et al. | |
| 2013/0274782 A1 | 10/2013 | Morgan | |
| 2014/0046357 A1* | 2/2014 | Neoh | A61M 29/00 |
| | | | 606/191 |
| 2015/0094543 A1 | 4/2015 | Whittaker et al. | |
| 2016/0242794 A1* | 8/2016 | Terashi | A61B 17/22 |
| 2016/0287849 A1* | 10/2016 | Hodson | A61M 29/00 |
| 2017/0296221 A1 | 10/2017 | Di Caprio et al. | |
| 2019/0001456 A1 | 1/2019 | Kalhori et al. | |
| 2020/0016385 A1 | 1/2020 | Fuseya et al. | |
| 2020/0016386 A1 | 1/2020 | Fuseya et al. | |
| 2020/0016387 A1 | 1/2020 | Fuseya et al. | |
| 2021/0001097 A1 | 1/2021 | Fuseya et al. | |

FOREIGN PATENT DOCUMENTS

| | | |
|---|---|---|
| JP | 2001-286963 A | 10/2001 |
| JP | 2002-177289 A | 6/2002 |
| JP | 2004-9844 A | 1/2004 |
| JP | 2005-118102 A | 5/2005 |
| JP | 2006-130073 A | 5/2006 |
| JP | 2007-501102 A | 1/2007 |
| JP | 2007-98120 A | 4/2007 |
| JP | 2008-11867 A | 1/2008 |
| JP | 2012-095812 A | 5/2012 |
| JP | 2012-100827 A | 5/2012 |
| JP | 2012-179222 A | 9/2012 |
| JP | 2012-183125 A | 9/2012 |
| JP | 2014-136047 A | 7/2014 |
| JP | 2014-524807 A | 9/2014 |
| JP | 2019-507021 A | 3/2019 |
| WO | 91/07202 A1 | 5/1991 |
| WO | 2004/066827 A3 | 8/2004 |
| WO | 2010/123825 A1 | 10/2010 |
| WO | 2013/038720 A1 | 3/2013 |
| WO | 2015/032727 A1 | 3/2015 |

* cited by examiner

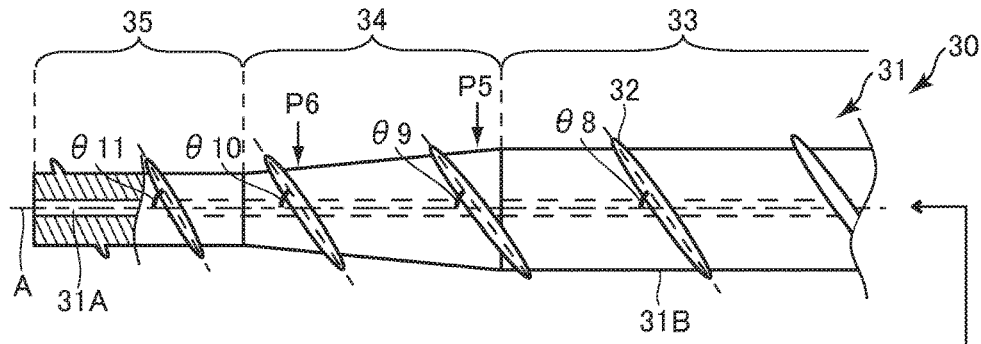
FIG. 4
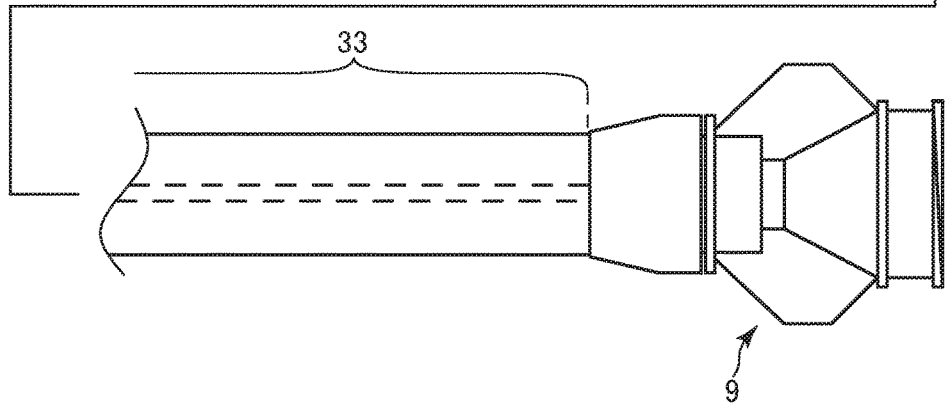
FIG. 5
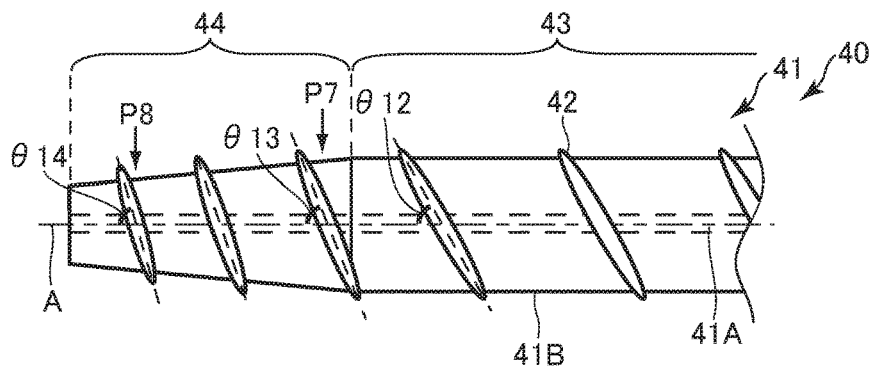
FIG. 6
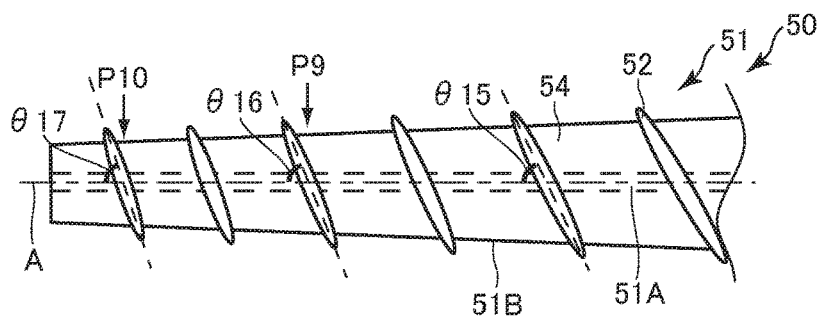

DILATOR

This application is a continuation application of International Application No. PCT/JP2018/035088, filed Sep. 21, 2018, which claims priority to International Application No. PCT/JP2018/011672, filed Mar. 23, 2018. The contents of these applications are incorporated herein by reference in their entirety.

BACKGROUND

The disclosed embodiments relate to a dilator.

Dilators that enable treatment by enlarging a penetration-hole formed in the wall of a patient's digestive tract or the like are known. The distal end of the dilator is inserted into the penetration-hole formed in the wall, and the penetration-hole is expanded by pushing a tapered part into the penetration-hole. Such a dilator is disclosed according to Japanese Patent Document JP2008-11867.

SUMMARY

In the dilator mentioned above, a sufficient thrust could not be achieved with respect to the tapered part, which experiences an increased resistance when being pushed into a penetration-hole or constricted part, and in some cases the penetration-hole or constricted part could not be sufficiently expanded.

The present disclosure has an object of providing a dilator that suppresses unnecessary rotation and can easily widen the diameter of a penetration-hole formed in the wall of a digestive tract or the like.

In order to achieve the object, a dilator according to an aspect of the present disclosure comprises a shaft in a hollow shape, in which an outer diameter of a distal end is smaller than an outer diameter of a proximal end, and a grip part that is provided on the proximal end of the shaft. A spirally-arranged protruding portion that protrudes toward an exterior is provided on an outer peripheral face of the shaft, and the spirally-arranged protruding portion has gaps between sections that are neighboring along an axis of the shaft. The shaft has, along the axis, a first location and a second location that is located closer to the distal end than the first location and has an outer diameter smaller than an outer diameter at the first location, and the spirally-arranged protruding portion has, with respect to the axis, an angle of inclination that is larger at the second location than at the first location.

BRIEF DESCRIPTION OF THE DRAWINGS

FIG. 4 is an overall view of a dilator of the disclosed embodiments;

FIG. 5 is a diagram showing a distal end side section of a dilator of the disclosed embodiments;

FIG. 6 is a diagram showing a distal end side section of a dilator of the disclosed embodiments;

DETAILED DESCRIPTION

Figure 1:
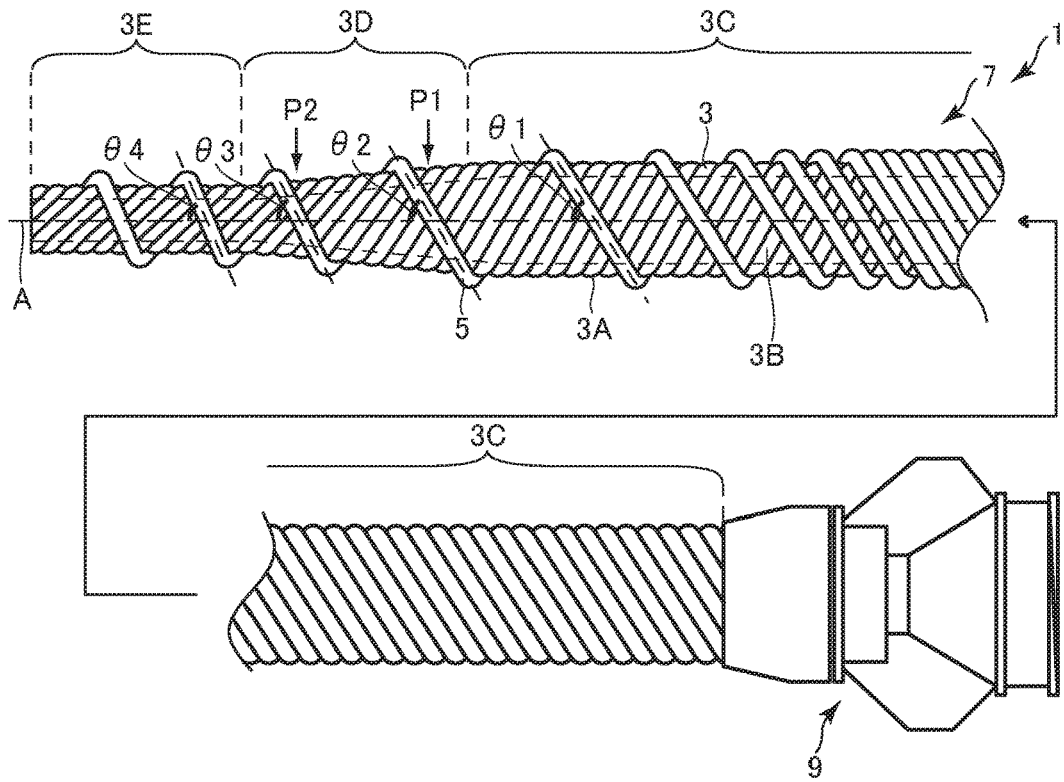
FIG. 1 is an overall view of a dilator of the disclosed embodiments.

Hereinafter, embodiments of the present disclosure will be described with reference to the drawings. Note that the dimensions of the dilators shown in the drawings are dimensions shown for the purpose of facilitating an understanding of the technical matters, and do not correspond to the actual dimensions.

A dilator of the present disclosure will be described with reference to the drawings.

FIG. 1 is an overall view of a dilator 1 of the disclosed embodiments.

Furthermore, in FIG. 1, the left side of the drawing is the distal end side (distal side) inserted into the body, and the right side is the proximal end side (proximal side) operated by an operator such as a physician.

In FIG. 1, the dilator 1 comprises: a multilayered body 7 including a first coil 3 formed by winding a plurality of metal wires into a hollow shape, and a second coil 5 formed by winding a single metal wire onto an outer peripheral face 3A of the first coil 3 in an opposite direction (wound clockwise toward the distal end) to the first coil 3 (wound counterclockwise toward the distal end); and a hollow connector 9 connected to a proximal end of the multilayered body 7.

The wires constituting the first coil 3 and the second coil 5 are, for example, metal wires made of stainless steel or a superelastic alloy such as nickel-titanium, or are resin wires.

The first coil 3 is formed, for example, by winding ten metal wires made of stainless steel. The first coil 3 has a hollow shape and is formed having a lumen 3B that passes through from the distal end to the proximal end. The first coil 3 includes a body portion 3C, a tapered part 3D, and a distal end part 3E. The first coil 3 corresponds to a shaft.

The body portion 3C is located on the proximal end side of the dilator 1, and a connector 9 is connected to the proximal end thereof. Furthermore, the body portion 3C has a substantially constant outer diameter from the proximal end to the distal end.

The tapered part 3D is located on the distal end side of the body portion 3C, extends from the distal end of the body portion 3C toward the distal end side, and has an outer diameter that decreases toward the distal end side. The tapered part 3D corresponds to a section of the distal end side of the shaft.

The distal end part 3E is located on the distal end side of the tapered part 3D and extends from the distal end of the tapered part 3D toward the distal end side. The distal end part 3E has a substantially constant outer diameter from the proximal end to the distal end. As a result, the first coil 3, which serves as the shaft, has a hollow shape in which the outer diameter of the distal end is smaller than the outer diameter of the proximal end.

The second coil 5 is, for example, a single metal wire which is wound around onto the outer peripheral face 3A of the first coil 3 in an opposite direction (wound clockwise toward the distal end) to the first coil 3 (wound counter-clockwise toward the distal end). Here, the metal wire is closely wound (without spacing) on the proximal end side, and is wound with spacing on the distal end side of the body portion 3C, the tapered part 3D, and the distal end part 3E. A spirally-arranged protruding portion that protrudes toward the exterior (radially outward from the outermost surface and outermost part of the dilator 1) is provided on the outer peripheral face 3A of the first coil 3 as a result of the section of the second coil 5 being wound with spacing. That is, the section of the second coil 5 wound with spacing forms a spirally-arranged protruding portion on the outer peripheral face 3A of the first coil 3. The spirally-arranged protruding portion has gaps between sections that are neighboring (gaps between adjacent windings of the metal wire) along the axis A (longitudinal axis) of the first coil 3. The dilator 1 can also be moved forward by a rotation operation of the dilator 1 as a result of a screw action of the spirally-arranged protruding portion.

Furthermore, the second coil 5 is configured such that, in the section which is provided with a mutual separation (spacing) along the axis A, the angle of inclination with respect to the axis A of the first coil 3 gradually increases from the body portion 3C through the tapered part 3D to the distal end part 3E. In the dilator 1, $\theta 1$ to $\theta 4$ in FIG. 1 are set such that $\theta 4 > \theta 3 > \theta 2 > \theta 1$. That is to say, along the axis A, the angle of inclination at the second location P2 is larger than the angle of inclination at the first location P1. The second location P2 is located further to the distal end side than the first location P1 and has a smaller outer diameter than the outer diameter at the first location P1.

Furthermore, the metal wire of the second coil 5 is wound such that the size of the gaps between neighboring windings of the metal wire gradually decreases toward the proximal end side of the body portion 3C. As a result of this configuration, the rigidity of the dilator 1 (multilayered body 7) in the axial direction can be gradually changed, and the dilator 1 can easily advance along a path even when a curved path is to be travelled.

The length of the dilator 1 and the other dilators described below is, for example, 2000 mm, and may be 1600 mm to 2500 mm; and the length of the distal end part 3E is, for example, 10 mm, and may be 0 to 100 mm. The length of the tapered part 3D is, for example, 30 mm, and may be 5 to 100 mm. The inner diameter at the distal end of the first coil 3 is, for example, 0.7 mm, and may be 0.4 to 1.0 mm. The inner diameter at the proximal end of the first coil 3 is, for example, 1.5 mm, and may be 1.0 to 3.0 mm. The outer diameter at the distal end of the second coil 5 is, for example, 1.84 mm, and may be 0.8 to 3.0 mm; and the outer diameter at the proximal end of the second coil 5 is, for example, 2.64 mm, and may be 1.4 to 5.0 mm. Furthermore, the diameter of the metal wires of the first coil 3 is, for example, 0.21 mm, and may be 0.1 to 0.5 mm. The diameter of the metal wires of the second coil 5 is, for example, 0.36 mm, and may be 0.1 to 0.5 mm.

Furthermore, the angle of inclination ($\theta 1$) of the second coil 5 (spirally-arranged protruding portion) on the body portion 3C is 60°, the angle of inclination ($\theta 4$) of the second coil 5 (spirally-arranged protruding portion) on the distal end part 3E is 70°, and the ratio between the two angles ($\theta 4/\theta 1$) is 1.17. The angle of inclination ($\theta 1$) of the second coil 5 (spirally-arranged protruding portion) on the body portion 3C may be 7° to 82°, the angle of inclination ($\theta 4$) of the second coil 5 (spirally-arranged protruding portion) on the distal end part 3E may be 14° to 87°, and the ratio between the two angles ($\theta 4/\theta 1$) may be 1.06 to 12.4.

The connector 9, which is a grip part, is a part that an operator uses to push the dilator into the body or perform a rotation operation. The distal end of the connector 9 is connected to the proximal end of the first coil 3 and the proximal end of the second coil 5. The connector 9 is made of resin, and has a hollow shape having a lumen which communicates with the lumen 3B of the first coil 3.

In the dilator 1 of the present disclosure, a spirally-arranged protruding portion (second coil 5) that protrudes toward the exterior is provided on the outer peripheral face 3A of first coil 3, which serves as the shaft, and the spirally-arranged protruding portion has gaps between sections that are neighboring along the axis A of the first coil 3. This configuration not only enables the dilator to be moved forward in a conventional fashion by a pressing operation, but also to be moved forward by a rotation operation as a result of the spirally-arranged protruding portion.

Furthermore, the spirally-arranged protruding portion (second coil 5) of the dilator 1 of the present embodiment is formed so that, along the axis A, the angle of inclination at the second location P2 is larger than the angle of inclination at the first location P1. The second location P2 is located further to the distal end side than the first location P1 and has a smaller outer diameter than the outer diameter at the first location P1. Therefore, the angle of inclination of the spirally-arranged protruding portion becomes larger in sections where the outer diameter of the first coil 3, which serves as the shaft, is relatively smaller. As a result, the spirally-arranged protruding portion firmly catches the target object (for example, a digestive tract such as the stomach, or the liver). Consequently, spinning of the dilator 1 can be suppressed at sections where the outer diameter of the first coil 3, which serves as the shaft, is relatively smaller.

Furthermore, the first coil 3, which serves as the shaft, has the tapered part 3D on a section on the distal end side, and therefore, the penetration-hole can be smoothly expanded.

Moreover, because the shaft is constituted by the first coil 3, in which a plurality of metal wires is wound in a hollow shape, the flexibility and torquability of the shaft can be improved. In addition, because the spirally-arranged protruding portion is constituted by the second coil 5, in which a single metal wire is wound around onto the outer peripheral face 3A of the first coil 3, the spirally-arranged protruding portion can be easily formed, and the elasticity of the second coil 5 ensures the softness of the distal end of the dilator 1, and enables the torquability to be improved. Also, because the wires of the first coil 3 and the second coil 5 are wound in mutually opposite directions, even when the dilator 1 is rotated in a direction that opens the first coil 3, a force is applied in a direction that closes the second coil 5, which inhibits the first coil 3 from opening and enables the force applied to the connector 9 of the dilator 1 to be delivered to the distal end side.

Next, an example of a usage mode of the dilator will be described.

First, a target object is punctured with an introducer needle to form a penetration-hole. Then, after inserting a guide wire into a lumen of the introducer needle, the introducer needle is removed.

Next, the proximal end of the guide wire is inserted into the lumen of the dilator, and the dilator is inserted. Then, the dilator is pushed forward while rotating the shaft to expand the hole of the punctured part. At this time, the tapered portion advances due to a screw action or the like of the spirally-arranged protruding portion caused by a rotation operation of the shaft, and the penetration-hole can be smoothly expanded by the tapered part.

Figure 2:
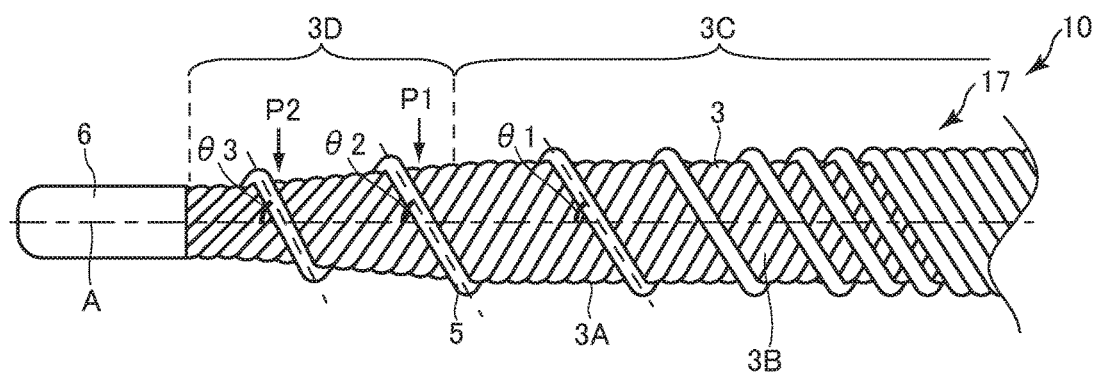
FIG. 2 is a diagram showing a distal end side section of a dilator of the disclosed embodiments.

FIG. 2 is a diagram showing a distal end side section of a dilator 10 of the disclosed embodiments.

Furthermore, in FIG. 2, the left side of the drawing is the distal end side (distal side) inserted into the body, and the right side is the proximal end side (proximal side) operated by an operator such as a physician.

The dilator 10 of the present embodiment has the same basic structure as the dilator 1, and therefore, the same reference numerals are given to the same members, and the description will not be repeated.

In FIG. 2, the dilator 10 comprises: a multilayered body 17 including a first coil 3 formed by winding a plurality of metal wires into a hollow shape, and a second coil 5 formed by winding a single metal wire onto an outer peripheral face 3A of the first coil 3 in an opposite direction (wound clockwise toward the distal end) to the first coil 3 (wound counterclockwise toward the distal end); and a hollow connector 9 connected to a proximal end of the multilayered body 17 (see FIG. 1). However, the dilator 10 differs from the dilator 1 in that a tip 6 is provided instead of the distal end part 3E of the first coil 3 of the dilator 1. In the dilator 10, the first coil 3, which is provided with the tip 6 on the distal end, corresponds to the shaft.

The tip 6 is formed by pouring a brazing material (such as a silver-tin brazing material or a gold-tin brazing material) into the distal end of the first coil 3, and the shape thereof is a substantially cylindrical hollow shape. Moreover, unlike the distal end of the multilayered body 7, the surface of the tip 6 does not have an uneven shape, and is flat.

In the dilator 10, the second coil 5 is configured such that, in the section which is provided with a mutual separation along the axis A, the angle of inclination with respect to the axis A of the first coil 3 gradually increases from the body portion 3C through the tapered part 3D to the tip 6. In the dilator 10, like the dilator 1, θ1 to θ3 in FIG. 2 are set such that θ3>θ2>θ1. That is to say, along the axis A, the angle of inclination at the second location P2 is larger than the angle of inclination at the first location P1. The second location P2 is located further to the distal end side than the first location P1 and has a smaller outer diameter than the outer diameter at the first location P1.

According to the dilator 10 having the configuration described above, the same effects as those of the dilator 1 can be obtained. Furthermore, because the tip 6, which has a flat surface, is connected to the distal end of the multilayered body 17, the insertability into a punctured part is further improved by first pushing the dilator against the punctured part, and then pushing the dilator while applying a rotation.

Figure 3:
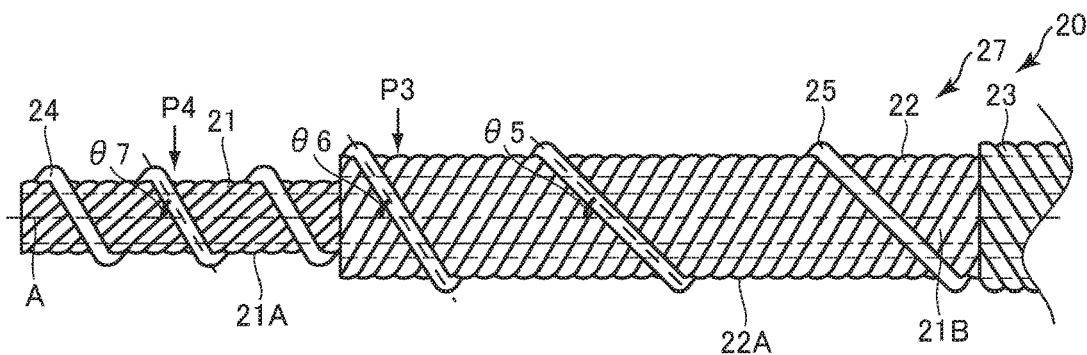
FIG. 3 is a diagram showing a distal end side section of a dilator of the disclosed embodiments.

FIG. 3 is a diagram showing a distal end side section of a dilator 20 of the disclosed embodiments.

Furthermore, in FIG. 3, the left side of the drawing is the distal end side (distal side) inserted into the body, and the right side is the proximal end side (proximal side) operated by an operator such as a physician.

In FIG. 3, the dilator 20 comprises: a multilayered body 27 including a hollow coil body 21, a coil body 22, a coil body 23, a coil body 24, and a coil body 25; and a hollow connector 9 connected to a proximal end of the multilayered body 27 (FIG. 1).

The hollow coil body 21 is formed having a cylindrical hollow shape by winding a plurality of metal wires (for example, ten wires). In FIG. 3, the common inner tangent line of the hollow coil body 21 is indicated by a dotted line (the innermost of the three dotted lines), and a lumen 21B is formed on the inside of the common inner tangent line of the hollow coil body 21. As defined herein, the common inner tangent line of a hollow coil body is a line that is tangent to an innermost surface (in a radial direction) of each of the metal wires forming the hollow coil body.

The distal end of the coil body 22 is located further to the proximal end side than the distal end of the hollow coil body 21, and the coil body 22 is formed having a cylindrical hollow shape by winding a plurality of metal wires (for example, 16 wires) onto the outer peripheral face 21A of the hollow coil body 21. The plurality of metal wires of the coil body 22 is wound in the same direction as the hollow coil body 21 (wound counterclockwise toward the distal end). In FIG. 3, the common inner tangent line of the coil body 22 is indicated by a dotted line (the middle of the three dotted lines).

The distal end of the coil body 23 is located further to the proximal end side than the distal end of the coil body 22, and the coil body 23 is formed having a cylindrical hollow shape by winding a plurality of metal wires (for example, 23 wires) onto the outer peripheral face 22A of the coil body 22. The plurality of metal wires of the coil body 23 is wound in the opposite direction (wound clockwise toward the distal end) to the coil body 22 (wound counterclockwise toward the distal end). In FIG. 3, the common inner tangent line of the coil body 23 is indicated by a dotted line (the outermost of the three dotted lines).

The coil body 22 is formed by being twisted onto the outer peripheral face 21A of the hollow coil body 21, and the coil body 23 is formed by being twisted onto the outer peripheral face 22A of the coil body 22. Therefore, the hollow coil body 21 and the coil body 22, which correspond to the shaft, form a hollow shape in which the outer diameter of the distal end is smaller than the outer diameter of the proximal end.

The coil body 24 is formed by winding, with spacing, a single metal wire onto the outer peripheral face 21A of the coil body 21 in the opposite direction (wound clockwise toward the distal end) to the coil body 21 (wound counterclockwise toward the distal end). The coil body 25 is formed by winding, with spacing, a single metal wire onto the outer peripheral face 22A of the coil body 22 in the opposite direction (clockwise toward the distal end) to the coil body 22 (wound counterclockwise toward the distal end).

In the dilator 20, the shape of the multilayered body 27 is a stepped cylindrical hollow shape that does not have a tapered part.

Note that the hollow coil body 21 and the coil body 22 correspond to the shaft and the first coil, and the coil bodies 24 and 25 correspond to the spirally-arranged protruding portion and the second coil.

In the dilator 20, the wires of the hollow coil body 21, the coil body 22, and the coil body 23 are closely wound, and the wires of the coil body 24 and the coil body 25 are wound with spacing. The coil body 24 provides the outer peripheral face 21A of the hollow coil body 21 with a spirally-arranged protruding portion that protrudes toward the exterior (from the outermost surface and outermost part of the dilator 20), and the coil body 25 provides the outer peripheral face 22A of the hollow coil body 22 with a spirally-arranged protruding portion that protrudes toward the exterior (from the outermost surface and outermost part of the dilator 20). The spirally-arranged protruding portion has gaps between sections that are neighboring along the axis A of the hollow coil body 21.

Note that, in the dilator 20, the wires constituting the hollow coil body 21, the coil body 22, the coil body 23, the coil body 24, and the coil body 25 may be metal wires made of stainless steel or a superelastic alloy such as nickel-titanium, but they are not limited to being metal wires and may also be resin wires.

Furthermore, the coil body 24 and the coil body 25 are configured such that the angle of inclination with respect to the axis A of the hollow coil body 21 and the coil body 22 gradually increases from the proximal end side to the distal end side (from the coil body 22 side to the hollow coil body 21 side). In the dilator 20, θ5 to θ7 in FIG. 3 are set such that θ7>θ6>θ5. That is to say, along the axis A, the angle of inclination at the second location P4 is larger than the angle of inclination at the first location P3. The second location P4 is located further to the distal end side than the first location P3 and has a smaller outer diameter than the outer diameter at the first location P3.

The spirally-arranged protruding portion (coil bodies 24 and 25) of the dilator 20 of the present embodiment is formed so that, along the axis A, the angle of inclination at the second location P4 is larger than the angle of inclination at the first location P3. The second location P4 is located further to the distal end side than the first location P3 and has a smaller outer diameter than the outer diameter at the first location P3. Therefore, the angle of inclination of the spirally-arranged protruding portion becomes larger at the hollow coil body 21, which is a section where the outer diameter of shaft is relatively smaller. As a result, the spirally-arranged protruding portion firmly catches the target object (for example, a digestive tract such as the stomach, or the liver). Consequently, spinning of the dilator 20 can be suppressed at the hollow coil body 21, which is a section where the outer diameter of the shaft is relatively smaller.

Moreover, because the shaft is constituted by the hollow coil body 21 and the coil body 22 (first coil), in which a plurality of metal wires is wound in a hollow shape, the softness of the shaft and the torquability of the shaft can be improved. In addition, because the spirally-arranged protruding portion is constituted by the coil body 24 (second coil), in which a single metal wire is wound around onto the outer peripheral face 21A of the hollow coil body 21, and the coil body 25 (second coil), in which a single metal wire is wound around onto the outer peripheral face 22A of the coil body 22, the spirally-arranged protruding portion can be easily formed, and the elasticity of the spirally-arranged protruding portion ensures the softness of distal end of the dilator 20, and enables the torquability to be improved. Also, because the wires of the hollow coil body 21 and the coil body 22 are wound in an opposite direction to wires of the coil body 24 and the coil body 25 respectively, even when the dilator 20 is rotated in a direction that opens the hollow coil body 21 and the coil body 22, a force is applied in a direction that closes the coil body 24 and the coil body 25, which inhibits the hollow coil body 21 and the coil body 22 from opening and enables the force applied to the connector 9 of the dilator 20 to be delivered to the distal end side.

FIG. 4 is an overall view of a dilator 30 of the disclosed embodiments.

Furthermore, in FIG. 4, the left side of the drawing is the distal end side (distal side) inserted into the body, and the right side is the proximal end side (proximal side) operated by an operator such as a physician.

In FIG. 4, the dilator 30 comprises a shaft 31, a spirally-arranged protruding portion 32, and a connector 9 that is connected to the proximal end of the shaft 31.

The shaft 31 has a hollow shape and is formed having a lumen 31A that passes through from the distal end to the proximal end. Furthermore, the shaft 31 includes a body portion 33, a tapered part 34, and a distal end part 35.

The material forming the shaft 31 and the spirally-arranged protruding portion 32 is not particularly limited as long as it ensures the softness of the tapered part 34 and the distal end part 35 and is biocompatible, and examples include stainless steel, superelastic alloys such as nickel-titanium alloy, and synthetic resins such as polyvinyl chloride resins, urethane resins, polyolefin resins, polyamide resins, and fluorine resins.

The body portion 33 is located on the proximal end side of the dilator 30, and a connector 9 is connected to the proximal end thereof. Furthermore, the body portion 33 has a substantially constant outer diameter from the proximal end to the distal end.

The tapered part 34 is connected to the distal end of the body portion 33, extends from the distal end of the body portion 33 toward the distal end side, and has a shape which is tapered toward the distal end side. That is to say, the tapered part 34 is configured such that the outer diameter at the distal end side is smaller than the outer diameter at the proximal end side.

The distal end part 35 is connected to the distal end of the tapered part 34, and extends from the distal end of the tapered part 34 toward the distal end side. The distal end part 35 has a substantially constant outer diameter from the proximal end to the distal end. As a result, the shaft 31 has a hollow shape in which the outer diameter of the distal end is smaller than the outer diameter at the proximal end.

A spirally-arranged protruding portion 32 is provided on the outer peripheral face 31B of the shaft 31 so as to protrude toward the exterior (from the outermost surface and outermost part of the dilator 30). The spirally-arranged protruding portion 32 is provided on a distal end side section of the body portion 33, the tapered part 34, and the distal end part 35, and has gaps between sections that are neighboring along an axis A of the shaft 31. That is to say, sections of the spirally-arranged protruding portion 32 that are neighboring are mutually separated. The spirally-arranged protruding portion 32 is integrally formed with the shaft 31 by casting or the like.

Furthermore, the spirally-arranged protruding portion 32 is configured such that the angle of inclination with respect to the axis A of the shaft 31 gradually increases from the body portion 33 through the tapered part 34 to the distal end part 35. In the dilator 30, θ8 to θ11 in FIG. 4 are set such that θ11>θ10>θ9>θ8. That is to say, along the axis A, the angle of inclination at the second location P6 is larger than the angle of inclination at the first location P5. The second location P6 is located further to the distal end side than the first location P5 and has a smaller outer diameter than the outer diameter at the first location P5.

In the dilator 30 of the present disclosure, a spirally-arranged protruding portion 32 that protrudes toward the exterior is provided on the outer peripheral face 31B of shaft 31, and the spirally-arranged protruding portion 32 has gaps between sections that are neighboring along the axis A of the shaft 31. This configuration not only enables the dilator to be moved forward in a conventional fashion by a pressing operation, but also to be moved forward by a rotation operation as a result of the spirally-arranged protruding portion 32.

Furthermore, the spirally-arranged protruding portion 32 of the dilator 30 of the present embodiment is formed so that, along the axis A, the angle of inclination at the second location P6 is larger than the angle of inclination at the first location P5. The second location P6 is located further to the distal end side than the first location P5 and has a smaller outer diameter than the outer diameter at the first location P5. Therefore, the angle of inclination of the spirally-arranged protruding portion 32 becomes larger in sections where the outer diameter of shaft 31 is relatively smaller. As a result, the spirally-arranged protruding portion 32 firmly catches the target object (for example, a digestive tract such as the stomach, or the liver). Consequently, spinning of the dilator 30 can be suppressed at sections where the outer diameter of the shaft 31 is relatively smaller.

Moreover, because the shaft 31 has the tapered part 34 on a section on the distal end side, the penetration-hole can be smoothly expanded, and further, because the angle of inclination of the spirally-arranged protruding portion 32 is larger at the section of the shaft 31 where the outer diameter is relatively smaller, the spirally-arranged protruding portion 32 firmly catches the target object (for example, a digestive tract such as the stomach, or the liver), and spinning of the dilator 30 can be inhibited.

FIG. 5 is a diagram showing a distal end side section of a dilator 40 of the disclosed embodiments.

Furthermore, in FIG. 5, the left side of the drawing is the distal end side (distal side) inserted into the body, and the right side is the proximal end side (proximal side) operated by an operator such as a physician.

In FIG. 5, the dilator 40 comprises a shaft 41, a spirally-arranged protruding portion 42, and a connector 9 that is connected to the proximal end of the shaft 41 (see FIG. 4). The materials forming the shaft 41 and the spirally-arranged protruding portion 42 are the same as the materials forming the shaft 31 and the spirally-arranged protruding portion 32 of the dilator 30.

The shaft 41 has a hollow shape and is formed having a lumen 41A that passes through from the distal end to the proximal end. Furthermore, the shaft 41 includes a body portion 43 and a tapered part 44. The dilator 40 of the present embodiment differs from the dilator 30 in that it does not have a distal end part.

The configurations of the body portion 43 and the tapered part 44 are the same as those of the body portion 33 and the tapered part 34 in the dilator 30. Furthermore, a spirally-arranged protruding portion 42 is provided on the outer peripheral face 41B of the shaft 41 so as to protrude toward the exterior (from the outermost surface and outermost part of the dilator 40). The spirally-arranged protruding portion 42 is provided on a distal end side section of the body portion 43, and tapered part 44, and has gaps between sections that are neighboring along an axis A of the shaft 41. That is to say, sections of the spirally-arranged protruding portion 42 that are neighboring are mutually separated. The spirally-arranged protruding portion 42 is integrally formed with the shaft 41 by casting or the like.

Furthermore, the spirally-arranged protruding portion 42 is configured such that the angle of inclination with respect to the axis A of the shaft 41 gradually increases from the body portion 43 to the tapered part 44. In the dilator 40, θ12 to θ14 in FIG. 5 are set such that θ14>θ13>θ12. That is to say, along the axis A, the angle of inclination at the second location P8 is larger than the angle of inclination at the first location P7. The second location P8 is located further to the distal end side than the first location P7 and has a smaller outer diameter than the outer diameter at the first location P7.

In the dilator 40 of the present disclosure, a spirally-arranged protruding portion 42 that protrudes toward the exterior is provided on the outer peripheral face 41B of shaft 41, and the spirally-arranged protruding portion 42 has gaps between sections that are neighboring along the axis A of the shaft 41. This configuration not only enables the dilator to be moved forward in a conventional fashion by a pressing operation, but also to be moved forward by a rotation operation as a result of the spirally-arranged protruding portion 42.

Furthermore, the spirally-arranged protruding portion 42 of the dilator 40 of the present embodiment is formed so that, along the axis A, the angle of inclination at the second location P8 is larger than the angle of inclination at the first location P7. The second location P8 is located further to the distal end side than the first location P7 and has a smaller outer diameter than the outer diameter at the first location P7. Therefore, the angle of inclination of the spirally-arranged protruding portion becomes larger in sections where the outer diameter of shaft 41 is relatively smaller. As a result, the spirally-arranged protruding portion 42 firmly catches the target object (for example, a digestive tract such as the stomach, or the liver). Consequently, spinning of the dilator 40 can be suppressed at sections where the outer diameter of the shaft 41 is relatively smaller.

Moreover, because the shaft 41 has the tapered part 44 on a section on the distal end side, the penetration-hole can be smoothly expanded, and further, because the angle of inclination of the spirally-arranged protruding portion 42 is larger at the section of the shaft 41 where the outer diameter is relatively smaller, the spirally-arranged protruding portion 42 firmly catches the target object (for example, a digestive tract such as the stomach, or the liver), and spinning of the dilator 40 can be inhibited.

FIG. 6 is a diagram showing a distal end side section of a dilator 50 of the disclosed embodiments.

Furthermore, in FIG. 6, the left side of the drawing is the distal end side (distal side) inserted into the body, and the right side is the proximal end side (proximal side) operated by an operator such as a physician.

In FIG. 6, the dilator 50 comprises a shaft 51, a spirally-arranged protruding portion 52, and a connector 9 that is connected to the proximal end of the shaft 51 (see FIG. 4). The materials forming the shaft 51 and the spirally-arranged protruding portion 52 are the same as the materials forming the shaft 31 and the spirally-arranged protruding portion 32 of the dilator 30.

The shaft 51 has a hollow shape and is formed having a lumen 51A that passes through from the distal end to the proximal end. Furthermore, the shaft 51 includes a tapered part 54. The dilator 50 of the present embodiment differs from the dilator 30 in that it does not have a distal end part and a body portion. That is to say, the shaft 51 has a tapered shape in which the outer diameter gradually decreases over the full length from the proximal end to the distal end. Therefore, the shaft 51 has a hollow shape in which the outer diameter of the distal end is smaller than the outer diameter of the proximal end.

A spirally-arranged protruding portion 52 is provided on the outer peripheral face 51B of the shaft 51 so as to protrude toward the exterior (from the outermost surface and outermost part of the dilator 50). The spirally-arranged protruding portion 52 is provided on a distal end side section of the tapered part 54 and has gaps between sections that are neighboring along an axis A of the shaft 51. That is to say, sections of the spirally-arranged protruding portion 52 that are neighboring are mutually separated. The spirally-arranged protruding portion 52 is integrally formed with the shaft 51 by casting or the like.

The spirally-arranged protruding portion 52 is configured such that the angle of inclination with respect to the axis A of the shaft 51 gradually increases from the proximal end side to the distal end side of the tapered part 54. In the dilator 50, θ15 to θ17 in FIG. 6 are set such that θ17>θ16>θ15. That is to say, along the axis A, the angle of inclination at the second location P10 is larger than the angle of inclination at the first location P9. The second location P10 is located further to the distal end side than the first location P9 and has a smaller outer diameter than the outer diameter at the first location P9.

In the dilator 50 of the present disclosure, a spirally-arranged protruding portion 52 that protrudes toward the exterior is provided on the outer peripheral face 51B of shaft 51, and the spirally-arranged protruding portion 52 has gaps between sections that are neighboring along the axis A of the shaft 51. This configuration not only enables the dilator to be moved forward in a conventional fashion by a pressing operation, but also to be moved forward by a rotation operation as a result of the spirally-arranged protruding portion 52.

Furthermore, the spirally-arranged protruding portion 52 of the dilator 50 of the present embodiment is formed so that, along the axis A, the angle of inclination at the second location P10 is larger than the angle of inclination at the first location P9. The second location P10 is located further to the distal end side than the first location P9 and has a smaller outer diameter than the outer diameter at the first location P9. Therefore, the angle of inclination of the spirally-arranged protruding portion becomes larger in sections where the outer diameter of shaft 51 is relatively smaller. As a result, the spirally-arranged protruding portion 52 firmly catches the target object (for example, a digestive tract such as the stomach, or the liver). Consequently, spinning of the dilator 50 can be suppressed at sections where the outer diameter of the shaft 51 is relatively smaller.

Moreover, because the shaft 51 has the tapered part 54, the penetration-hole can be smoothly expanded, and further, because the angle of inclination of the spirally-arranged protruding portion 52 is larger at the section of the shaft 51 where the outer diameter is relatively smaller, the spirally-arranged protruding portion 52 firmly catches the target object (for example, a digestive tract such as the stomach, or the liver), and spinning of the dilator 50 can be inhibited.

Although the embodiments of the present disclosure have been described above, the present disclosure is not limited to these embodiments, and various modifications can be made.

Figure 7:
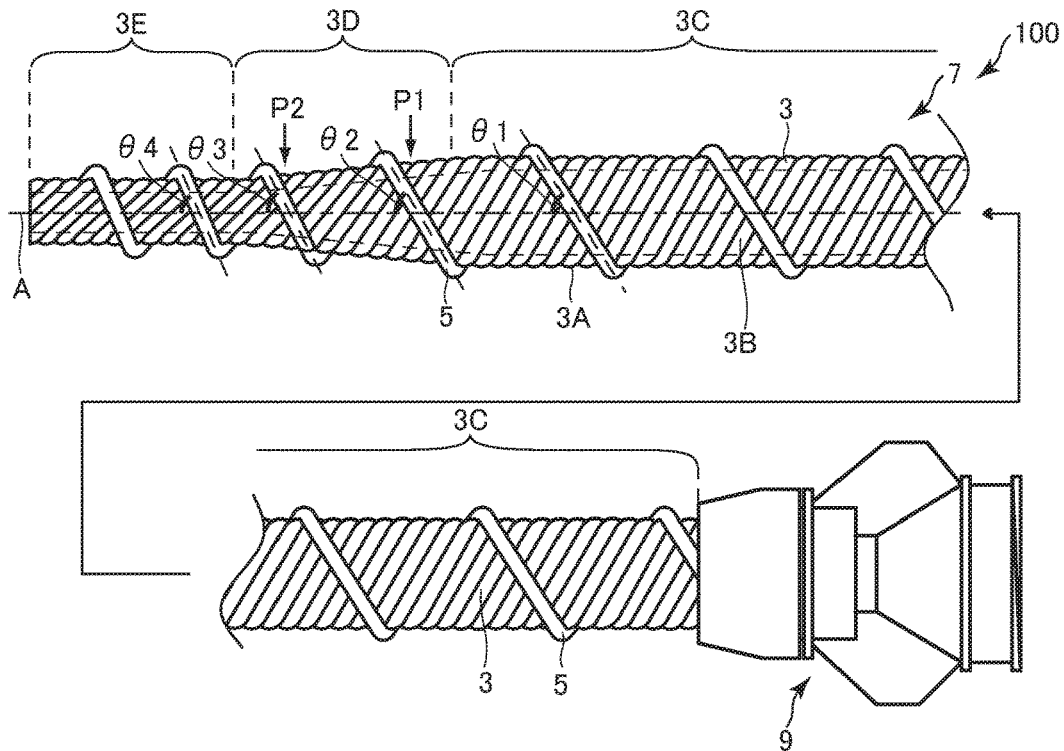
FIG. 7 is an overall view of a dilator of the disclosed embodiments.

Regarding the dilators 1, 10 and 20, for example, as shown in FIG. 7, the dilator may be a dilator 100 in which the second coil 5 has gaps between sections that are neighboring along the axial direction of the first coil 3 up to the proximal end thereof.

Furthermore, the dilator 1 was described in which the shaft and the spirally-arranged protruding portion are both constituted by a coil, and the dilators 30, 40, and 50 were described in which the shafts 31, 41, and 51 and the spirally-arranged protruding portions 32, 42, and 52 are integrally formed by casting or the like. However, the dilator may be formed such that, only the shaft is formed by casting, and the spirally-arranged protruding portion is constituted by a coil. That is to say, the dilator may also be a dilator 300 configured by a shaft 31 and a spirally-arranged protruding portion (second coil 5) as shown in FIG. 8, a dilator 400 configured by a shaft 41 and a spirally-arranged protruding portion (second coil 5) as shown in FIG. 9, or a dilator 500 configured by a shaft 51 and a spirally-arranged protruding portion (second coil 5) as shown in FIG. 10.

Figure 8:
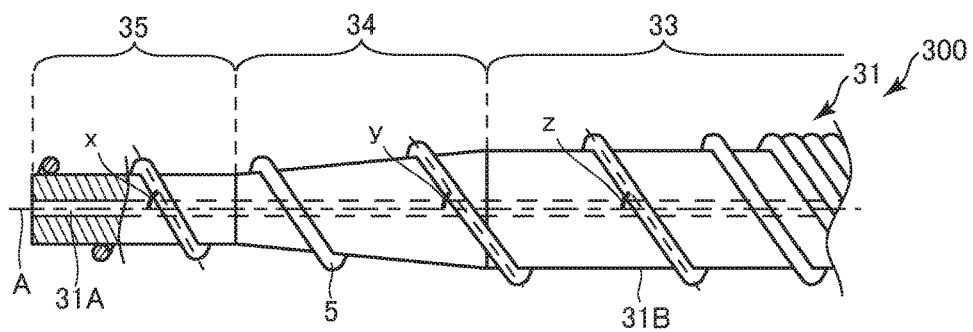
FIG. 8 is a diagram showing a distal end side section of a dilator of the disclosed embodiments.
Figure 9:
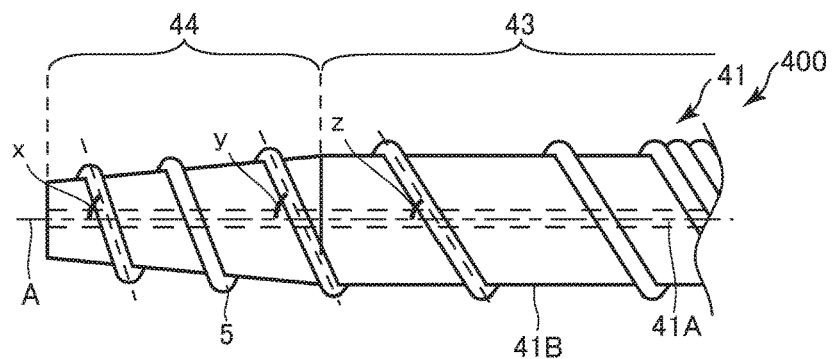
FIG. 9 is a diagram showing a distal end side section of a dilator of the disclosed embodiments.
Figure 10:
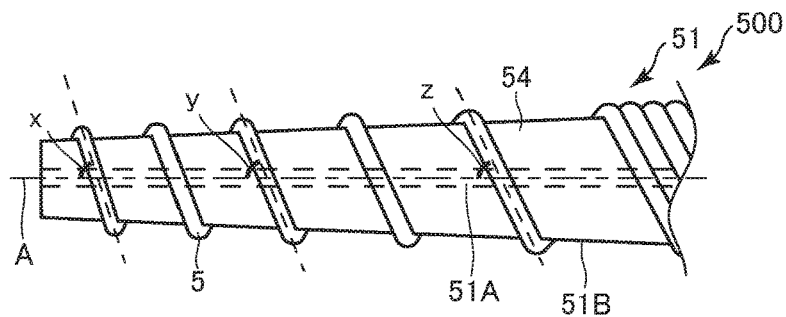
FIG. 10 is a diagram showing a distal end side section of a dilator of the disclosed embodiments.

In the dilators 300, 400, and 500 in FIG. 8 to FIG. 10, like the dilators of the embodiments above, sections of the second coil 5 which are mutually separated along the axis A are configured so that the angle of inclination with respect to the axis A of the shafts 31, 41, and 51 gradually increases from the proximal end side to the distal end side. That is to say, x, y, and z in FIG. 8 to FIG. 10 are set so that x>y>z. The angle of inclination at the second location, which is located further to the distal end side than the first location and has a smaller outer diameter than the outer diameter of the first location, is configured to be larger than the angle of inclination at the first location along the axis A.

Figure 11:
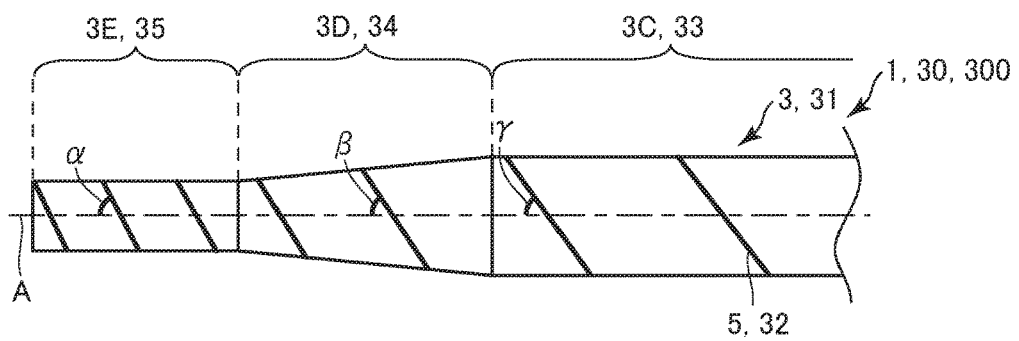
FIG. 11 is a schematic view of a distal end side section of dilators of the disclosed embodiments.

Furthermore, as shown in FIG. 11, relating to the dilator 1 (FIG. 1), the dilator 30 (FIG. 4), and the dilator 300 (FIG. 8), the second coil 5 and the spirally-arranged protruding portion 32 are configured so that the angle of inclination with respect to the axis A of the first coil 3 and the shaft 31 gradually increases from the body portions 3C and 33 through the tapered parts 3D and 34 to the distal end parts 3E and 35. That is to say, α, β, and γ in FIG. 11 are configured so that α>β>γ. Here, α is the angle of inclination of the second coil 5 and the spirally-arranged protruding portion 32 with respect to the axis A at the distal end parts 3E and 35, β is the angle of inclination of the second coil 5 and the spirally-arranged protruding portion 32 with respect to the axis A at the tapered parts 3D and 34, and γ is the angle of inclination of the second coil 5 and the spirally-arranged protruding portion 32 with respect to the axis A at the body portions 3C and 33.

Figure 12:
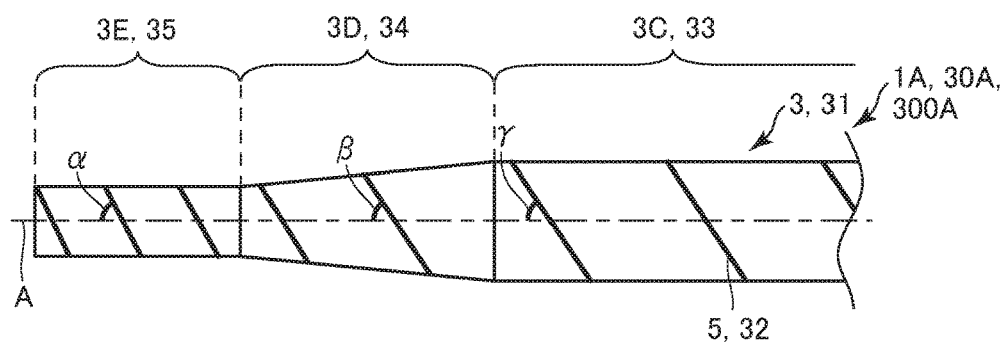
FIG. 12 is a schematic view showing a distal end side section of a dilator of the disclosed embodiments.
Figure 13:
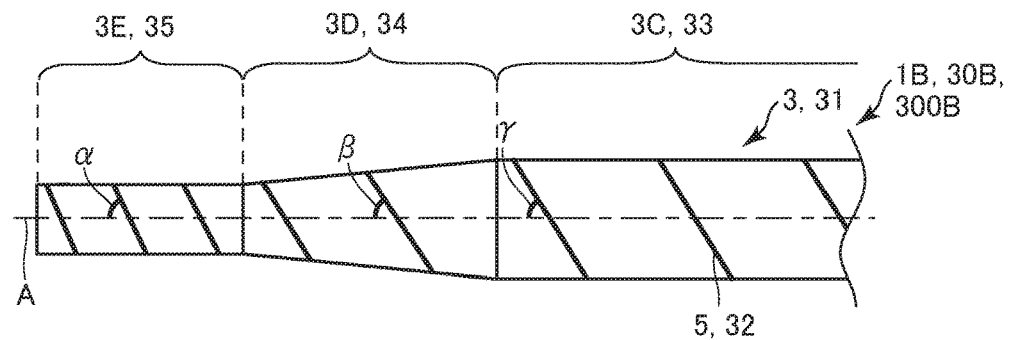
FIG. 13 is a schematic view showing a distal end side section of a dilator of the disclosed embodiments.
Figure 14:
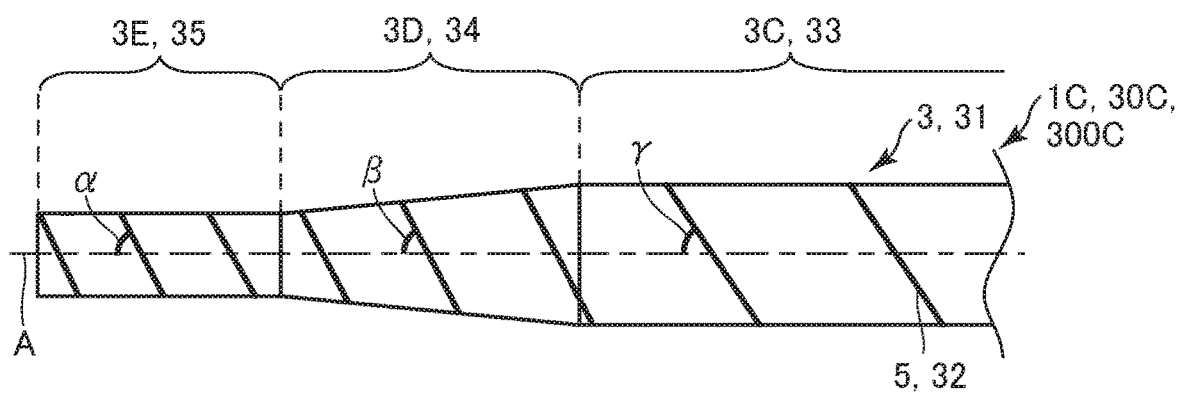
FIG. 14 is a schematic view showing a distal end side section of a dilator of the disclosed embodiments.
Figure 15:
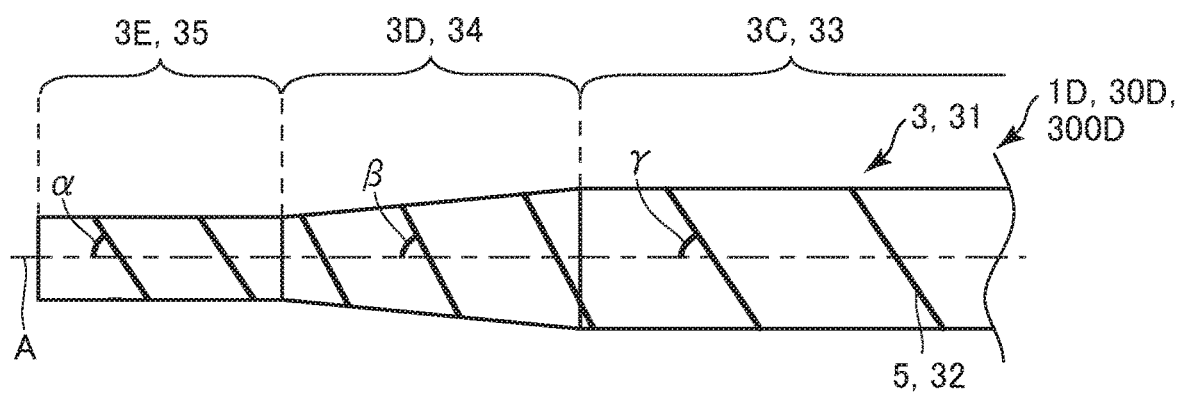
FIG. 15 is a schematic view showing a distal end side section of a dilator of the disclosed embodiments.

However, if the relationship α>β is satisfied, for example, dilators 1A, 30A, and 300A, where α>β=γ (see FIG. 12), and dilators 1B, 30B, and 300B, where α>β, and β<γ (see FIG. 13) are also possible. Furthermore, if the relationship β>γ is satisfied, for example, dilators 1C, 30C, and 300C, where α=β>γ (see FIG. 14), and dilators 1D, 30D, and 300D, where α<β, and β>γ (see FIG. 15) are also possible. In addition, if the relationship α>γ is satisfied, for example, the relationships α>β, α=β, α<β, β>γ, and β<γ are also possible.

Note that the dilators 1A, 1B, 1C, and 1D are modifications of the dilator 1 where the shaft and the spirally-arranged protruding portion are both configured by a coil in a similar fashion to the dilator 1 of FIG. 1, the dilators 30A, 30B, 30C, and 30D are modifications of the dilator 30 where the shaft and the spirally-arranged protruding portion are both integrally formed by casting or the like in a similar fashion to the dilator 30 of FIG. 4, and further, the dilators 300A, 300B, 300C, and 300D are modifications of the dilator 300 where the shaft is formed by casting or the like, and the spirally-arranged protruding portion is configured by a coil in a similar fashion to the dilator 300 of FIG. 8.

In a dilator where the shaft and the spirally-arranged protruding portion are both integrally formed by casting or the like in a similar fashion to the dilator 30 of FIG. 4, the spirally-arranged protruding portion may be provided up to the proximal end of the shaft. Furthermore, relating to the dilators shown in FIGS. 1 to 3 and FIGS. 8 to 10, the second coil provided on the outer circumference of the shaft may or may not have gaps between sections that are neighboring along the axis of the shaft up to the proximal end thereof.

Moreover, in the embodiments above, although the first coils 3 and 21 were described as hollow coil bodies formed from ten wires, the number of wires is not limited to ten, and may be one or more.

In addition, in the embodiments above, although the coil body 22 was described as a coil body formed from sixteen wires, the number of wires is not limited to sixteen, and may be one or more.

Also, in the embodiments above, although the coil body 23 was described as a coil body formed from 23 wires, the number of wires is not limited to 23, and may be one or more.

Furthermore, although the tip 6 in the dilator 10 is formed by pouring a brazing material into the distal end of the multilayered body 17, a tip 6 having a flat surface may be formed by polishing the second coil 5 near the distal end part of the multilayered body 17 and/or the outer circumference of the first coil 3.

Moreover, although the tip 6 in the dilator 10 is fixed to the distal end of the multilayered body 17, the tip may be fixed to the distal end of the multilayered body 27 in the dilator 20, the distal end of the shaft 31 in the dilator 30, the distal end of the shaft 41 in the dilator 40, and the distal end of the shaft 51 in the dilator 50.

Figure 16:
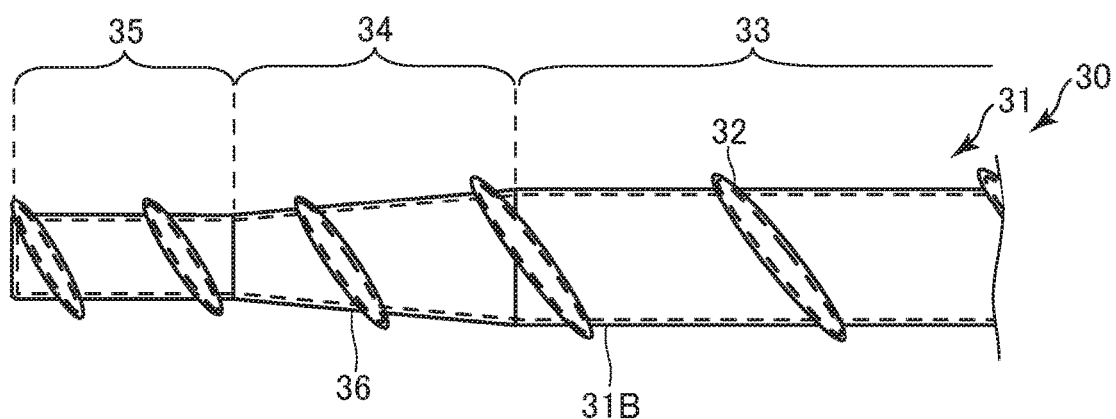
FIG. 16 is a diagram showing a distal end side section of a dilator of the disclosed embodiments.

In addition, the multilayered bodies 7, 17, and 27 in the dilators 1, 10, and 20, and the shafts 31, 41, and 51 and the spirally-arranged protruding portions 32, 42, and 52 in the dilators 30, 40, and 50 may have the outer circumference coated with a resin. For example, as shown in FIG. 16, the outer circumference of the shaft 31 and the spirally-arranged protruding portion 32 of the dilator 30 may be coated with a resin 36. The resin 36 can improve the slidability. Also, as a result of this coating, in the embodiments where the shaft is constituted by the first coil 3, it is possible to inhibit living tissue from becoming trapped between the wires of the first coil 3 (sections that are neighboring along the axis A of the first coil 3 constituting the shaft), or in the embodiments where the spirally-arranged protruding portion includes the second coil, it is possible to inhibit living tissue from becoming trapped between the second coil and the shaft. When the outer circumference of the shaft 31 is coated by the resin 36, the sections of the body portion 33, the tapered part 34, and the distal end part 35 that are coated by the resin 36 correspond to the shaft 31, and the sections that protrude toward the exterior from the outer peripheral face 31B of the shaft 31 correspond to the spirally-arranged protruding portion 32. Examples of the resin 36 include biocompatible resin materials such as polyamide resins and fluororesins, and hydrophilic coating materials, and the thickness thereof is, for example, 0.1 to 300 μm. In addition, although the shafts 31, 41, and 51 were integrally formed with the spirally-arranged protruding portions 32, 42, and 52, these may be separately formed.

Moreover, in the embodiments above, although the second coils 5, 24, and 25 and the spirally-arranged protruding portions 32, 42, and 52 were configured such that the angle of inclination gradually decreased toward the proximal end side, a configuration in which the angle of inclination decreases in a stepwise fashion is also possible. In addition, although the shafts 31, 41, and 51 were integrally formed with the spirally-arranged protruding portions 32, 42, and 52, these may be separately formed. Furthermore, the first locations P1, P3, P5, P7, and P9 and the second locations P2, P4, P6, P8, and P10 are not limited to the positions described in the embodiments above, and the first location and the second location may be located anywhere that satisfies the relationship that the second location is located further to the distal end side than the first location, and has a smaller outer diameter than the outer diameter at the first location.

In the embodiments shown in FIG. 1 to FIG. 16, dilators not having a coating on the surface of the shaft (other than the resin 36 in FIG. 16) were described. However, the shaft may have various coatings on the surface side (including parts between the shaft and the spirally-arranged protruding portion). Examples of the coating include a protective film (a typical example being a plating film) on the surface of the shaft, and a base film for improving the adhesion between the shaft and the spirally-arranged protruding portion.

In the embodiments shown in FIG. 1 to FIG. 16, the spirally-arranged protruding portion preferably does not constitute a blade. The dilators of the present embodiments expand a pre-formed penetration-hole in a target object (an example being the wall of a digestive tract such as a patient's stomach). Therefore, if the spirally-arranged protruding portion constitutes a blade, the living tissue on the inner surface of the penetration-hole may become damaged.

Therefore, the cross-sectional shape of the spirally-arranged protruding portion (for example, the shape of a cross-section taken orthogonally to the helix direction of the spirally-arranged protruding portion shown in FIG. 4) preferably does not include a corner portion having an acute angle on the radially outer end part of the shaft. That is to say, the end part preferably has a part which is formed having, for example, a shape including a corner portion having an obtuse angle, or a curve (for example, a curve containing part of a circle or an ellipse).

The invention claimed is:

1. A dilator for expanding a penetration hole in a target object, the dilator comprising:
    a shaft having a hollow shape and an outer diameter that is smaller at a distal end of the shaft than at a proximal end of the shaft, wherein the shaft includes:
        a first coil comprising a first wire wound into a hollow shape; and
        a lumen that passes through the first coil from the distal end of the shaft to the proximal end of the shaft and that terminates at the distal end of the shaft with a distal end opening that faces a distal direction; and
    a spirally-arranged protruding portion provided on an outer peripheral surface of the shaft and protruding radially outward from the shaft, the spirally-arranged protruding portion having gaps between adjacent sections of the spirally-arranged protruding portion along a longitudinal axis of the shaft,
wherein:
    the outer diameter of the shaft is larger at a first position along the longitudinal axis than at a second position along the longitudinal axis, the second position being closer to the distal end of the shaft than the first position, and
    an angle of inclination of the spirally-arranged protruding portion, with respect to the longitudinal axis, is larger at the second position than at the first position so that the spirally-arranged protruding portion is configured to catch the target object during rotation of the dilator in the penetration hole, wherein the angle of inclination is an acute angle.

2. The dilator according to claim 1, wherein
    a section of the shaft on a distal end side of the shaft has a tapered shape having an outer diameter that decreases toward the distal end of the shaft.

3. The dilator according to claim 1, wherein
    the spirally-arranged protruding portion includes a second coil comprising a wire wound around on the outer peripheral surface of the shaft.

4. The dilator according to claim 3, wherein:
    the wire of the first coil and the wire of the second coil are wound in opposite directions.

5. The dilator according to claim 1, further comprising:
a grip portion provided at the proximal end of the shaft.

6. The dilator according to claim 1, wherein
the shaft has a tapered part, the first and second positions are at the tapered part, and an outer diameter of the tapered part is larger at the first position than at the second position.

7. The dilator according to claim 6, wherein
the shaft has a distal end part and a body portion, the distal end part being distal of the tapered part, the body portion being proximal of the tapered part, the distal end part having a constant outer diameter, and the angle of inclination of the spirally-arranged protruding portion being larger at the distal end part than at the body portion.

8. The dilator according to claim 1, wherein
the lumen is configured to receive a guidewire that protrudes from the distal end opening.

9. The dilator according to claim 1, wherein
the shaft has a tapered part and a body portion positioned proximally of the tapered part, the first and second positions being at the tapered part, an outer diameter of the tapered part being larger at the first position than at the second position, the body portion having a constant outer diameter, and the angle of inclination of the spirally-arranged protruding portion being larger at the tapered part than at the body portion.

10. A dilator comprising:
a shaft having a hollow shape and an outer diameter that is smaller at a distal end of the shaft than at a proximal end of the shaft, wherein the shaft includes:
a lumen that passes through the shaft from the distal end of the shaft to the proximal end of the shaft and that terminates at the distal end of the shaft with a distal end opening that faces a distal direction; and
a spirally-arranged protruding portion provided on an outer peripheral surface of the shaft and protruding radially outward from the shaft, the spirally-arranged protruding portion having gaps between adjacent sections of the spirally-arranged protruding portion along a longitudinal axis of the shaft,
wherein:
the spirally-arranged protruding portion includes a first coil comprising a wire wound around on the outer peripheral surface of the shaft,
the outer diameter of the shaft is larger at a first position along the longitudinal axis than at a second position along the longitudinal axis, the second position being closer to the distal end of the shaft than the first position, and
an angle of inclination of the spirally-arranged protruding portion, with respect to the longitudinal axis, is larger at the second position than at the first position, wherein the angle of inclination is an acute angle.

11. The dilator according to claim 10, wherein
a section of the shaft on a distal end side of the shaft has a tapered shape having an outer diameter that decreases toward the distal end of the shaft.

12. The dilator according to claim 10, wherein
the shaft includes a second coil comprising a wire wound into a hollow shape.

13. The dilator according to claim 12, wherein
the wire of the first coil and the wire of the second coil are wound in opposite directions.

14. The dilator according to claim 10, further comprising:
a grip portion provided at the proximal end of the shaft.

15. The dilator according to claim 10, wherein
a distalmost portion of the dilator has a substantially cylindrical hollow shape.

16. A dilator comprising:
a shaft having a hollow shape and an outer diameter that is smaller at a distal end of the shaft than at a proximal end of the shaft, wherein the shaft includes:
a first coil comprising a first wire wound into a hollow shape; and
a lumen that passes through the first coil from the distal end of the shaft to the proximal end of the shaft and that terminates at the distal end of the shaft with a distal end opening that faces a distal direction; and
a spirally-arranged protruding portion provided on an outer peripheral surface of the shaft and protruding radially outward from the shaft, the spirally-arranged protruding portion having gaps between adjacent sections of the spirally-arranged protruding portion along a longitudinal axis of the shaft,
wherein:
the spirally-arranged protruding portion includes a second coil comprising a second wire wound around on the outer peripheral surface of the shaft,
the outer diameter of the shaft is larger at a first position along the longitudinal axis than at a second position along the longitudinal axis, the second position being closer to the distal end of the shaft than the first position, and
an angle of inclination of the spirally-arranged protruding portion, with respect to the longitudinal axis, is larger at the second position than at the first position, wherein the angle of inclination is an acute angle.

17. The dilator according to claim 16, wherein
a section of the shaft on a distal end side of the shaft has a tapered shape having an outer diameter that decreases toward the distal end of the shaft.

18. The dilator according to claim 16, wherein
the wire of the first coil and the wire of the second coil are wound in opposite directions.

19. The dilator according to claim 16, further comprising:
a grip portion provided at the proximal end of the shaft.

20. The dilator according to claim 16, wherein
a distalmost portion of the dilator has a substantially cylindrical hollow shape.

* * * * *